(12) United States Patent
Bailey

(10) Patent No.: US 6,477,433 B1
(45) Date of Patent: Nov. 5, 2002

(54) CONTROL OF VELOCITY LIMITED SYSTEMS

(75) Inventor: David A. Bailey, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/315,563

(22) Filed: May 20, 1999

Related U.S. Application Data

(60) Provisional application No. 60/087,923, filed on Jun. 4, 1998.

(51) Int. Cl.[7] .......................... G05B 11/32; G05B 13/02; G05B 19/416
(52) U.S. Cl. ............................. 700/69; 700/34; 700/54; 318/568.18
(58) Field of Search .......................... 700/32–35, 44–46, 700/54, 69; 318/568.18

(56) References Cited

U.S. PATENT DOCUMENTS

| 4,297,734 A | * 10/1981 | Laishley et al. ......... 360/78.09 |
| 4,988,935 A | * 1/1991 | York ..................... 318/568.18 |

* cited by examiner

Primary Examiner—Leo Picard
Assistant Examiner—Elliot Frank
(74) Attorney, Agent, or Firm—Robert E. Greenstien

(57) ABSTRACT

In a position in control, a velocity error is compared to a limit that is a non-linear, continuous and differentiable function of the position error. If the position error is greater than a limit or magnitude, the velocity limit is used for the velocity command; otherwise the position error is used.

6 Claims, 2 Drawing Sheets

CONTROL OF VELOCITY LIMITED SYSTEMS

This application claims priority from provisional application 60/087,923, filed on Jun. 4, 1998.

TECHNICAL FIELD

This invention relates to position controls.

BACKGROUND OF THE INVENTION

In control systems, there is a class of control problems that exhibit velocity limits that change independently of the position controller. Electro-mechanical position controllers use motors that have an inherent velocity limit in the back EMF of the motor verses the supplied voltage to the system. As the supply voltage varies the velocity limit of the system varies.

Hydraulic systems are limited by the pump characteristics and other loads on the hydraulic pump when the actuator is operated. In a single gimbal control moment gyroscope (CMG) controlled satellite application, the velocity limit becomes the available angular momentum from the CMG array.

The problem with a velocity limit force limited system is that there is inconsistent performance when the velocity limit changes. Using a linear control results in good performance with a low velocity limit but a system that overshoots if there is are high velocity limit. Conversely, good performance with a high velocity limit introduces a longer settling time than a smaller velocity limit. Conversely, good performance with a high velocity limit and produces a long settling time with a smaller velocity limit.

FIG. 1 exemplifies the prior art and the limit problem- A controller 10 provides a position command Xc which is summed with the velocity and position of an object or "mass" 12. A force limited actuator 14, such as a CMG, is controlled by the position there are 16 and moves in the mass 12. The function 18 represents the inherent actuator force limit as a function of input position error at 16. The function 18 output is effectively summed with a velocity limit VL from a velocity limit 11 for the actuator, such as a power supply limit or CMG angular momentum saturation. The actuator has inherent feedback and transfer characteristics 14a–d, in addition to the force limitation that is represented by transfer function 18. The performance of this system for a small 0.1 inch step in Xc (commanded position) followed by a large 2.4 inch step to 2.5 inches would show that for the small step the mass moves precisely with no overshoot because the velocity limit of the actuator is not reached. However, for the large step the system is limited by velocity limit, which results in a large overshoot and ringing.

Following classic control theory, two approaches have been used on this common problem. One centers on finding a compromise set of gains that give good performance with some intermediate velocity limit with some modest over shoot at high velocity limits and some long tails (decay or settling time) at low velocity limits. This solution works well if the variation in the velocity limit is not very large. A second approach pre-calculates a new set of gains for each transient but suffers from miscalculation when the initial and actual conditions are different, for instance a second position change is commanded during a transient. The controller can be confused by this change and produce incorrect gains. For that reason, this gain solution is not widely used.

DISCLOSURE OF THE INVENTION

Figure 1:
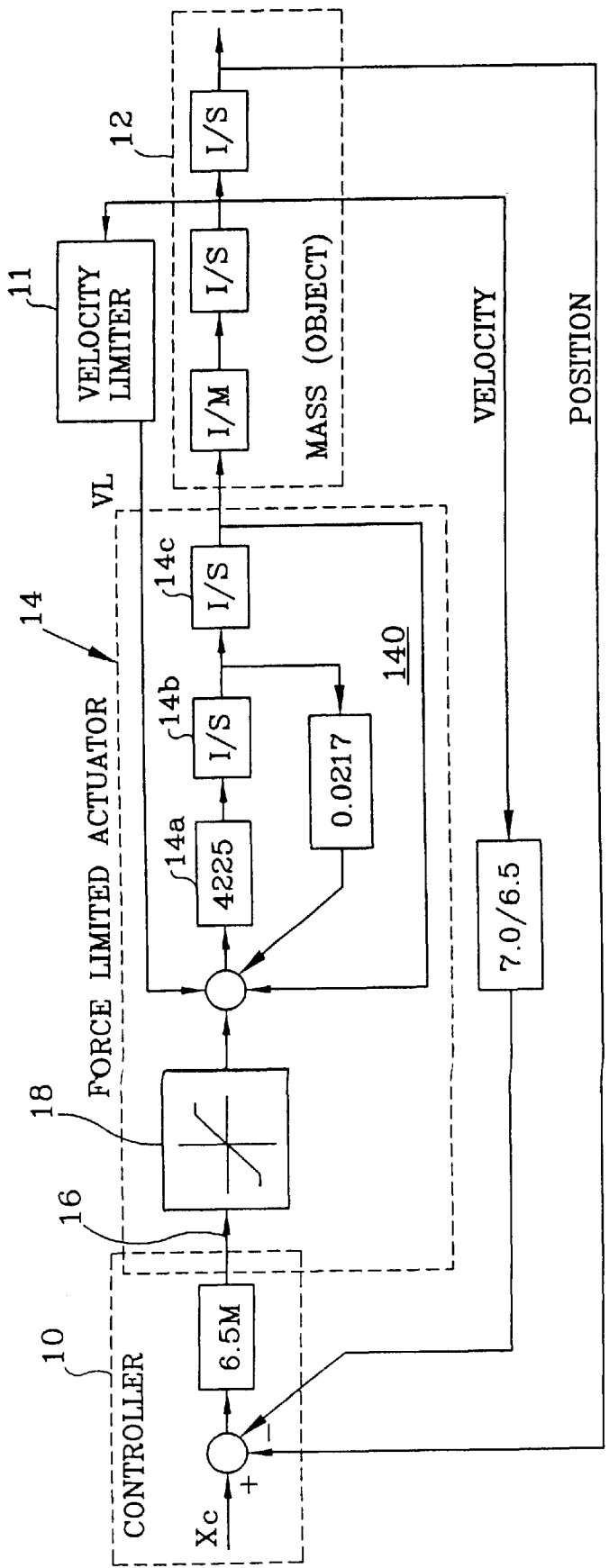
FIG. 1 is a functional block diagram of a prior art control system.

According to the invention, a velocity error is compared to a limit that is a non-linear (continuous, differentiable) function of the position error. If the position error is greater than a limit or magnitude, the velocity limit is used for the velocity command; otherwise the position error is used. The velocity command is compared with the velocity feedback to generate the velocity error.

According to the invention, in a single axis position control in a velocity limited system, the position error is used to produce a commanded or desired velocity value which is applied to a non-linear velocity limit defined by the following functions:

$$\dot{x} = k \cdot \sqrt{-2 \cdot a \cdot x} \text{ for } x<0$$

Similarly for errors greater than zero $$\dot{x} = -k \cdot \sqrt{2 \cdot a \cdot x} \text{ for } x>0$$

According to the invention, in a multi-axis position control, such as a controlled momentum gyro system in a satellite, where the unknown system velocity limit is function of the aggregate limits along the multiple axis, the second commanded velocity in axis is applied to a non-linear velocity limit using the following function:

$$x_i = \sqrt{\frac{2x_i^2}{\sqrt{\frac{x_1^2}{A_1^2} + \frac{x_2^2}{A_2^2} + \frac{x_3^2}{A_3^2}}}}$$

A benefit of the invention is that any transient settles in the same way, i.e., has the same overshoot, undershoot. Another benefit is that the performance is independent of the actuator (plant) velocity limit. An actuator's velocity limits do not have to be known. Using the "n" axis function as the basis for the velocity limit for each axis, a nonlinear control can be built based on ellipsoidal torque and velocity limits in an n-dimensional control, such as a CMG set in a satellite.

Other features and benefits of the invention will be apparent to one skilled in the art from the drawing and following discussion.

BEST MODE FOR CARRYING OUT THE INVENTION

Figure 2:
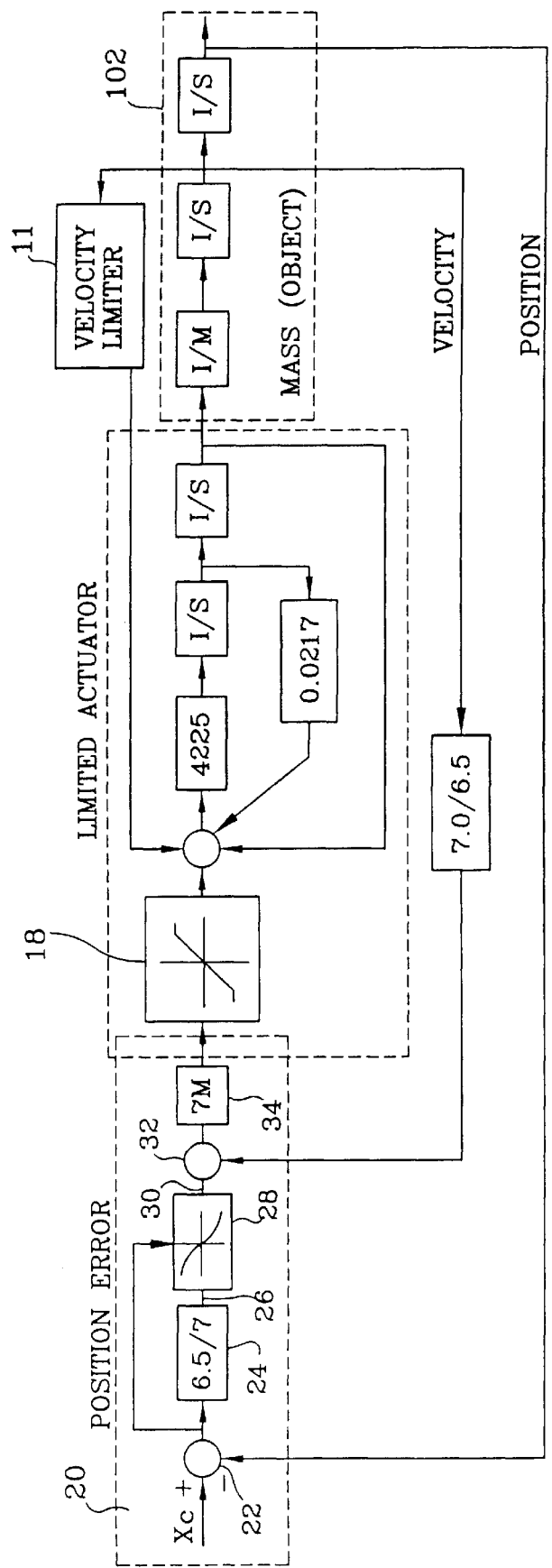
FIG. 2 is a functional block diagram of a control system that employs the present invention.

In FIG. 2, the reference numerals refer to the same functions and elements in FIG. 1, but the difference is found in the controller 20. FIG. 2 also shows a single axis control; that is, the mass moves in a straight line and neither it or the actuator 18 are rotating. It receives the position signal $X_c$ which is summed with object position at 22, the position error being applied to a gain 24, producing a velocity output at 26 that is applied to a non-linear limitation function 28 for the one or single axis based on the position error. The velocity command output at 30 is summed at 32 with the mass velocity, and the error is applied to a gain 34 to produce a force with a saturation that is applied to the actuator 18. The following explains the derivation of equations 1 and 2, which define the function 28 for a "single axis" control problem.

Single Axis Derivation of Non-linear Function $$\ddot{x}_c = 6.5 \cdot (x_c - x) - 7.0 \cdot \dot{x} \quad (1)$$

$$F_c = M \cdot \ddot{x}_c \quad (2)$$

By taking equation 1 and splitting it into two:

$$\dot{x}_c = 6.5 \cdot (x_c - x)/7.0 \quad (3)$$

$$\ddot{x}_c = 7.0 \cdot (\dot{x}_c - \dot{x}) \quad (4)$$

Now a nonlinear velocity limit can be placed after equation 3. The equation is based on constant acceleration at the limiting force.

$$a = \frac{\text{force\_limit}}{\text{mass}} \quad (5)$$

The equations for the velocity limit are based on position error so the requirement is to drive to the origin. If the position error is negative the velocity limit of interest is positive and the acceleration is negative.

$$\ddot{x} = -a \quad (6)$$

Integrating equation 6:

$$\dot{x} = -a \cdot t + v_0 \quad (7)$$

Integrating equation 7:

$$x = -\frac{a \cdot t^2}{2} + v_0 \cdot t - x_0 \quad (8)$$

At the final time $t_f$ both the velocity and the position must come to zero. Thus:

$$x_0 = -\frac{a \cdot t_f^2}{2} \quad \text{and} \quad v_0 = a \cdot t_f \quad (9)$$

Solving equation 8 for time t $$t = t_f - \sqrt{\frac{-2 \cdot x}{a}} \quad (10)$$

Substituting equations 9 and 10 into equation 7 produces:

$$\dot{x} = \sqrt{-2 \cdot a \cdot x} \text{ for } x < 0 \quad (11)$$

Similarly for errors greater than zero $$\dot{x} = -\sqrt{2 \cdot a \cdot x} \text{ for } x > 0 \quad (12)$$

Derivation of Non-linear Function for n-dimensions

The above is the solution in controlling the position of an object in one dimension. The following assumes that in FIG. 2, commanded position, feedback and position are quantified in three (n=3) dimensions. In a satellite using CMGs for attitude control the three dimensions are coupled, i.e., if roll is at maximum velocity there is no angular momentum to transfer to pitch or yaw. Furthermore, the peak rotational acceleration in each of the three axis are different because different inertia and angular momentum is available from the CMG array for different commanded attitude. Defining roll, pitch, and yaw as axis 1,2, and 3 respectively, the acceleration limits become:

$A_1, A_2, A_3,$ $$\frac{a_1^2}{A_1^2} + \frac{a_2^2}{A_2^2} + \frac{a_3^2}{A_3^2} = 1 \quad (13)$$

The desire is to bring the error to zero in each of the axes at the same time. This means that the deceleration time for each axis needs to be the same.

$$\frac{x_1^2}{b_1^2} + \frac{x_2^2}{b_2^2} + \frac{x_3^2}{b_3^2} = 1 \quad (14)$$

where $$b_n = \frac{1}{2} a_n \cdot t^2 \quad (15)$$

Solving for $t^4$:

$$\frac{4 \cdot x_1^2}{a_1^2} = \frac{4 \cdot x_2^2}{a_2^2} = \frac{4 \cdot x_3^2}{a_3^2} = t^4 \quad (16)$$

Now the individual accelerations (a) can be solved for.

$$a_1^2 = \frac{4x_1^2}{t^4} \quad a_2^2 = \frac{4x_2^2}{t^4} \quad a_3^2 = \frac{4x_1^2}{t^4} \quad (17)$$

Plugging in the values of a into equation 13 and solving for $t^2$ $$t^2 = 2 \cdot \sqrt{\frac{x_1^2}{A_1^2} + \frac{x_2^2}{A_2^2} + \frac{x_3^2}{A_3^2}} \quad (18)$$

Differentiating the square root of equation 16:

$$t = \frac{\dot{x}_1}{a_1} = \frac{\dot{x}_2}{a_2} = \frac{\dot{x}_3}{a_3} \quad (19)$$

Squaring the equation $$\dot{x}_i^2 = a_i^2 t^2 \quad (20)$$

Substituting equation 17 for $a_I$ $$\dot{x}_i^2 = \frac{4x_i^2}{t^4} t^2 \quad (21)$$

Simplifying, substituting equation 18 for $t^2$, and taking the square root $$\dot{x}_i = \sqrt{\frac{2x_i^2}{\sqrt{\frac{x_1^2}{A_1^2} + \frac{x_2^2}{A_2^2} + \frac{x_3^2}{A_3^2}}}} \quad (22)$$

Equation 13 produces a non-linear velocity limit as a function of position and maximum acceleration in three coupled axis where the only variable is position (e.g., position of one axis of the satellite) Using equation 22 for function 28 based as the basis for the velocity limit for the value 30 for each axis when the velocity error exceeds a certain maximum plus/minus value, a nonlinear control can be built based on ellipsoidal torque and velocity limits, where the velocity limit does not to be known be the control.

Although the invention has been shown and described with respect to exemplary embodiments thereof, it should be understood by those skilled in the art that various changes, additions and combinations of the features, components and functions disclosed herein may be made without departing from the spirit and scope of the invention.

What is claimed is:

1. A control system characterized by:
    an actuator;
    an object connected to the actuator;
    a velocity feedback loop that provides a velocity signal that represents a velocity of the object;
    a position feedback loop that provides a position signal that represents a change in position of the object;
    a position control that provides a force signal to f said actuators to produce a commanded force on the object from the actuator in response to a difference between a velocity limit signal and said velocity signal;
    means for producing a position error signal as a function of the difference between a commanded position signal and the position signal provided by the position feedback loop; and
    means for producing said velocity limit signal with a continuous, differentiable, non-linear value that is a function of the position error signal if said position error signal is greater than a first magnitude and is said position error signal if the magnitude of said position error signal is less than said first magnitude.

2. The control system described in claim 1, characterized in that:
    said means for producing the velocity limit signal comprises a function generator that outputs said velocity limit signal by performing the function comprising $\dot{x}=-k\sqrt{2ax}$ for a first value of x and $\dot{x}=k\sqrt{-2ax}$ for a second value of x where $\dot{x}$ is said velocity limit signal, x is said position error signal, a is an acceleration limit for the actuator and k is a constant.

3. The control system described in claim 1, characterized in that:
    said means for producing the velocity limit signal comprises a function generator that outputs said velocity limit signal by performing a function using the square root of the position error signal.

4. A control system characterized by:
    a plurality of actuators;
    an object connected to each of said plurality of actuators;
    a velocity feedback loop that provides a velocity signal that represents a velocity of the object in each of n axis;
    a position feedback loop that provides a position signal that represents a change in position of the object in each of said n axis;
    a position control that provides a force signal to each of the plurality of actuators to produce a commanded force on the object from the actuator in response to a difference between a velocity limit signal and said velocity signal;
    means for producing a position error signal manifesting the difference between a commanded position signal and the position signal provided by the position feedback loop; and
    means for producing said velocity limit signal with a continuous differentiable, non-linear value that is a function of the position error signal in each of said n axis if said position error signal is greater that a first magnitude and is said position error signal if the magnitude of said position error signal is less than said first magnitude.

5. The control system of claim 4, characterized in that:
    said function comprises the square root of the said position error signal for one of each of said n axis to a first power divided by a value based on an acceleration limit for an actuator.

6. The control system of claim 4, characterized in that:
    said means for producing the velocity limit signal comprises a function generator that outputs said velocity limit signal by performing the function $$\dot{x}_i = \sqrt{\frac{2x_i^2}{\sqrt{\frac{x_1^2}{A_1^2}+\frac{x_2^2}{A_2^2}+\frac{x_3^2}{A_3^2}}}},$$

where $\dot{x}_1$ is said velocity limit signal in one of the axis i, $x_i$ is the position error signal in said one axis and A is an acceleration limit for said actuator.

* * * * *